Figure 1:
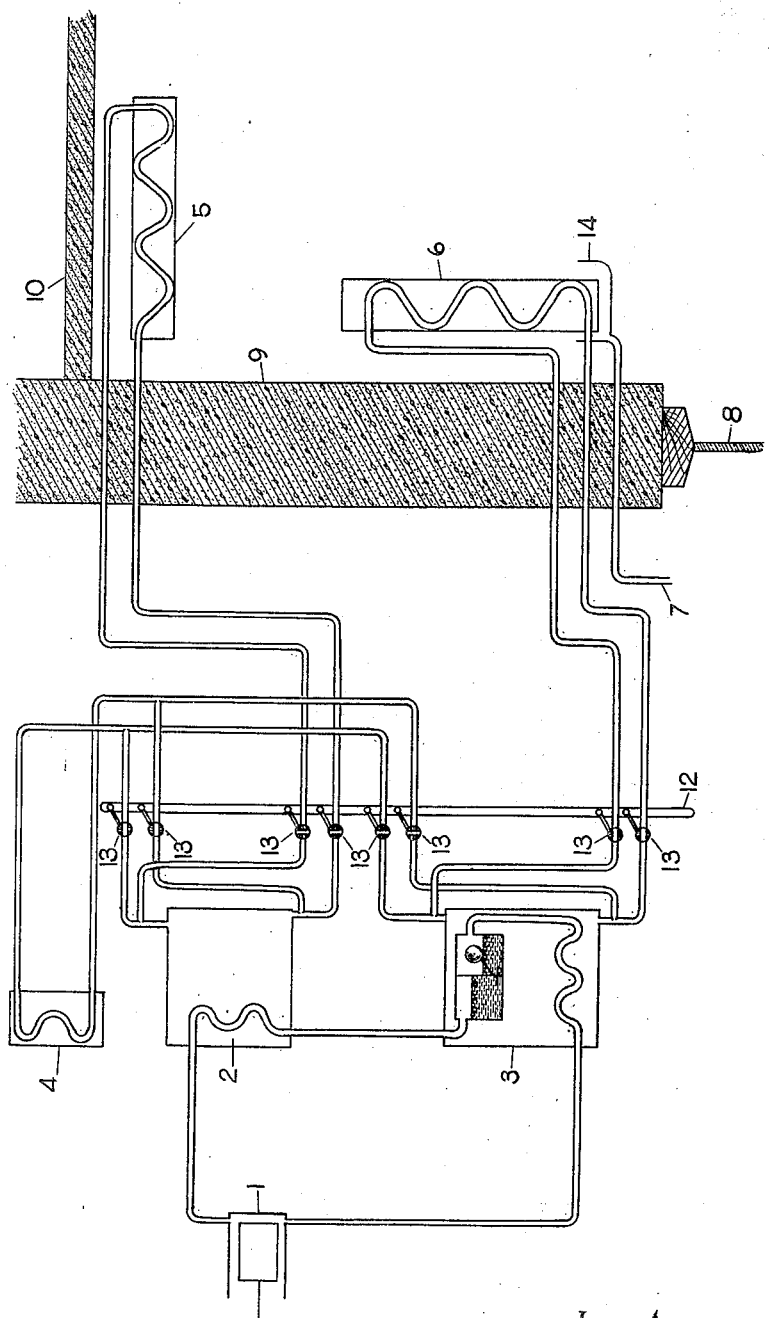

Dec. 12, 1950        T. S. SKILLMAN        2,533,407
HEATING AND COOLING SYSTEM
Filed Nov. 9, 1946        3 Sheets-Sheet 1

Inventor
Thomas S. Skillman
By Ward, Crosby & Neal
Attorneys

Dec. 12, 1950     T. S. SKILLMAN     2,533,407
HEATING AND COOLING SYSTEM

Filed Nov. 9, 1946     3 Sheets-Sheet 3

INVENTOR
Thomas S. Skillman
By Ward, Crosby & Neal
ATTORNEYS

Patented Dec. 12, 1950

2,533,407

UNITED STATES PATENT OFFICE 2,533,407

HEATING AND COOLING SYSTEM

Thomas Samuel Skillman, Mosman, near Sydney, New South Wales, Australia, assignor to Punch Engineering Pty. Limited, Cammeray, near Sydney, New South Wales, Australia, a company of New South Wales, Australia Application November 9, 1946, Serial No. 709,044
In Australia December 4, 1945

2 Claims. (Cl. 257—159)

The invention relates to heating and cooling systems.

It is an object of the invention to ensure comfortable conditions inside a room, for example, a room of a domestic house.

It has been established that the most comfortable conditions for an ordinary room are those which exist when the air in the room is cold, but the walls of the room are sufficiently warm to radiate an adequate amount of heat to the persons in the room. The walls should not be so warm, however, that persons are incommoded thereby. For cold weather, therefore, any heating system should aim to create warmth by radiation and without warming the air. For this reason heaters located in the ceiling or close to the ceiling have been widely advocated. For hot weather conditions, on the other hand, there appear to be two different kinds of uncomfortable conditions. The first of these arises from the air in the room being too hot or too humid even although the wall temperatures are not inconvenient. The second condition arises when the wall temperatures are too high and too much heat is radiated. An outside wall of a room is particularly liable to this sort of trouble.

A feature of the invention is a heat absorber located inside or forming part of one or more walls of the room. The heat absorber has an appreciable radiation area, and in one form this area can be adjusted. The effective radiation area of the absorber and the effective radiation temperature of the absorber are together adjusted to compensate for any excessive heat radiation from the walls of the room.

According to the invention the heat absorber has a plurality of panel surfaces directed into the room. The heat absorber in one form is adapted to form part of one or more of the walls of the room. The panel surfaces are preferably such that they can be decorated in any suitable manner. In a preferred form of the invention means are provided whereby each of the panel surfaces can be maintained at a selected temperature independently of whether other panels are maintained at another temperature or are merely allowed to go to the same temperature as the walls of the room.

The total heat radiation received on any small area (for example, portion of the face of a person in the room) comes from a multitude of directions. If the walls are too hot then the total radiation intensity received on the small area is greater than desirable. This can be reduced by preventing radiation from portion of a wall. It would obviously be impossible (or at least impracticable) to cut out all the radiation from any given portion of the walls in order to produce a comfortable average intensity falling on a small surface, for that would necessitate keeping that portion at absolute zero.

When arranged according to the invention, the heat absorber gives a considerably smaller intensity of radiation from its particular direction, but it has a somewhat larger area than would be required for a surface kept at absolute zero. The preferred temperature and area of the absorber can be related to the temperature and area of the remaining walls by the following equation:

$$O = A(T - \theta_a) + W(T - \theta_w)$$

in which: T is the optimum temperature of uniform surrounding walls; A is the solid angle subtended by the absorber at the point of absorption; $\theta_a$ is the temperature of the absorber; W is the solid angle subtended by the remainder of the wall; and $\theta_w$ is the temperature of the wall.

Considerable departure can be permitted from this relationship, of course, and usually the temperature $\theta_a$ or the area A would be readjusted only if and when the occupants of the room experienced any discomfort.

If the walls are not at uniform temperature then the second term in the equation breaks up into the sum of a number of like terms in obvious manner. Again, when there are two or more panel surfaces whose temperatures can be different, then the first term in the equation also breaks up into the sum of a number of like terms.

Another feature of the invention is that the effective air contact area and the effective air contact temperature of the absorber are readjustable. This can, of course, be combined with the radiation feature above described.

Another feature of the invention is a heat absorber having arrangements for disposing of any water condensed on the surfaces of the absorber. This can take the form of a tray on to which the water will drip, this tray being provided with a draining-off pipe leading out of the room in any suitable manner.

The adjustment made to the effective air contact area and the effective air contact temperature of the absorber is such as to precipitate water vapour if and when the humidity in the room exceeds a pre-determined value, preferably the value of humidity giving optimum comfort and which can be obtained from experimental data. Similarly, air contact area and temperature adjustment enables the actual air temperature to be brought to the optimum.

Where the room is nearly closed (for example, a living room of an average house which has to cater for only a few people), the air contact area need only be rather small.

Consider what happens when the heat absorber is first brought into use when the atmosphere is too humid. At first there will be a rather rapid condensation of water vapour due to the fact that the dew point of the air in the room will be considerably above the effective air contact temperature. As precipitation proceeds the dew point will be lowered quite apart from any incidental cooling of the air in the room, and after a time the dew point will fall so close to the temperature of the heat absorber that no more precipitation will occur.

Consider now the effect of ventilation. A small amount of new air must of course, be brought in from outside, say enough to satisfy the requirements of one or two people. This new air when mixed with the existing air will somewhat raise the dew point and more water vapour will be precipitated, provided of course that the air contact area is sufficient to cope with the precipitation required to keep the air at the proper dew point. For this reason it is preferable to have the air contact area adjustable so that this area can be increased if and when the room becomes more crowded. It is, of course, undesirable to provide too great an air contact area because the air would be cooled too much.

Another feature of the invention is a heat absorber adapted to form part of one or more walls of a room and having a plurality of panel surfaces directed into the room and in addition having air contact surfaces, said air contact surfaces being non-radiating (at least as far as radiation into the room is concerned).

In one form of the invention the air flows past the non-radiating air contact surfaces and can be regulated by adjustable louvres or vanes.

According to another feature of the invention the inflow of new air into the room for ventilation purposes is brought through the louvre arrangements controlling the flow of air past the non-radiating air contact surfaces. By these arrangements the new air is always at a higher dew point than would be the air coming in contact with the absorber were the new air first mixed with de-humidified air from the room. In this way the air contact area required for a given number of persons can be reduced, which enables a smaller installation to be provided.

Another feature of the invention is the provision of a heat pump to extract heat from the room in hot weather and to supply heat to the room in colder weather, the heat pump being sometimes connected to a heat absorber located inside or forming part of one or more walls of the room or being connected at other times to a heat radiator different from the heat absorber. Simple changeover arrangements can be made so that one room can be heated at the same time as a second room is being cooled, several rooms being served from the one heat pump. Arrangements are made whereby the heat pump radiates all its excess heat into the atmosphere outside the building altogether, or alternatively, whereby the heat pump receives all its heat supply from outside the building.

These and further features of the invention will be more clearly seen from the description of one embodiment of the invention made in connection with the drawings.

Figure 2:
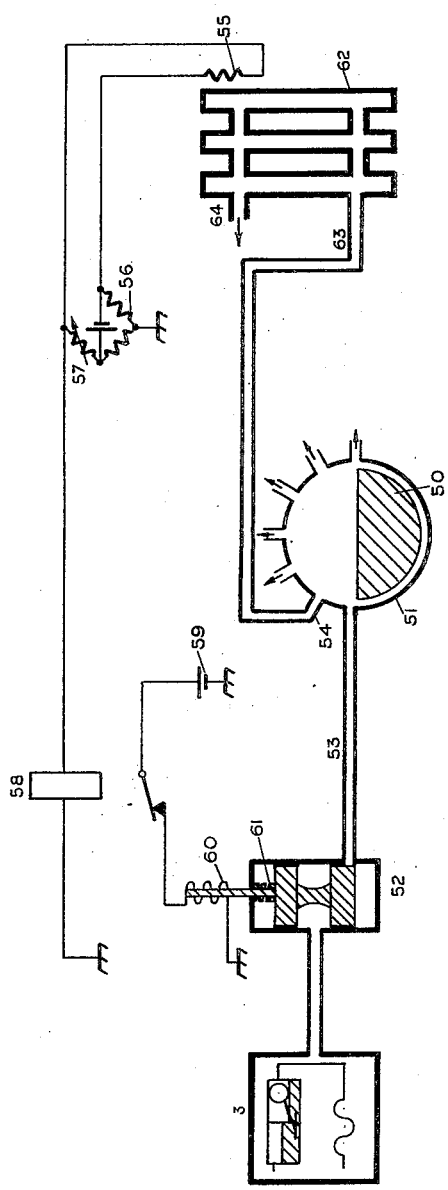
Figure 3:
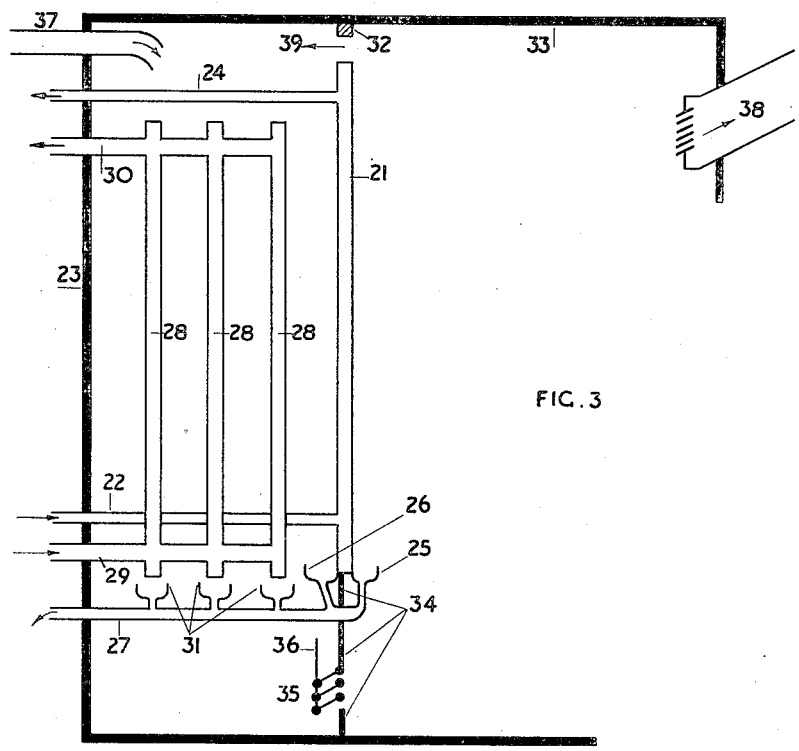
Figure 4A:
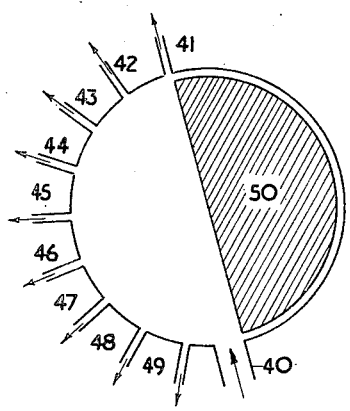
Figure 4B:
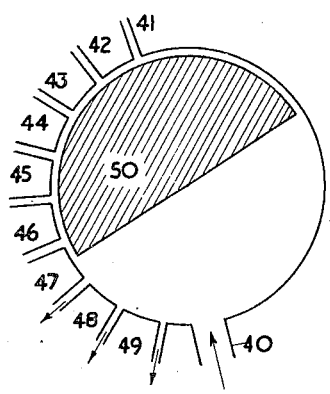

In these drawings Fig. 1 shows a heating and cooling system in accordance with the invention. Fig. 2 shows one method of independently adjusting the effective area and effective temperature of the radiation units or air contact units of a heating and cooling system in accordance with the invention. Fig. 3 shows one form of heat absorber and Figs. 4a and 4b show means whereby the effective radiation area can be adjusted in a heat absorber.

Referring to Fig. 1 a heat pump consists of a compressor 1, cooling unit 2 and an expansion or like freezing unit 3. This combination of units is similar to known refrigeration units and in this example is shown mounted on the outside wall 9 above a window 8. A heat radiator 5 is mounted on the interior of the building in this example near the ceiling 10 of the room whose window is 8. Above the window 8 is mounted a heat absorber 6. The preferred position for the heat radiator 5 is the ceiling as shown, but any other position can be used without departing from the spirit of the invention. Similarly any position can be used for the heat absorber 6 provided always that the unit is mounted in a vertical position, but the unit 6 should preferably be mounted close to the ceiling so that hot air near the ceiling will be cooled by coming in contact with the heat absorber 6. Of course, after being cooled, this air will fall towards the ground and will be replaced by warm air. In certain conditions of humidity moisture will condense on the heat absorber 6 and this moisture is drawn away by means of the gutter 14 and the pipe 7.

Outside the building is mounted a further unit 4 which can be used as the heat absorber or as the heat radiator.

When the heat radiator 5 is brought into use this unit radiates low temperature radiation directly to the occupants of the room. Additional radiation reaches the occupants by reflection from the window 8 and from other reflecting surfaces in the room, that arriving from the window compensating for the comparative absence of heat radiation through the window on cold days, or for the effective heat absorption through the window on cold days. Although the heat radiator 5 warms the air around it this air does not move but stays near the ceiling. In consequence of this, the air in the remainder of the room remains cool.

When the heat absorber 6 is brought into use it radiates much less radiation to the occupants of the room than does a corresponding area of the walls which are at a higher temperature, thereby reducing the total radiation received by the occupants to a comfortable amount. The layout shown in Fig. 1 is diagrammatic only and unit 6 actually consists of a plurality of separate panels each with its own supply pipe from the unit 3 and means are provided for bringing these panels into use as and when required to vary the effective radiation area of the whole heat absorber 6. This will be more fully described in connection with Fig. 4a and Fig. 4b. Known thermostat means (see Fig. 2) with provision for manual setting, operates upon the pipes leading to the separate units of the heat absorber 6. Similarly it may be applied to the heat radiator 5, or alternatively, can operate upon the compressor, for example, by the electric power circuit thereof.

These area and temperature control means are not shown in Fig. 1 which shows only the general arrangement of the system in its simplest form.

The compressor 1, the cooling unit or radiating unit 2 and the expansion or freezing unit 3 are shown connected by one pipe circuit in the usual manner. Other pipes lead from the radiating unit 2 to either the unit 4 or the unit 5 and another pipe circuit leads from the freezing unit 3 to the unit 4 or to the unit 6.

The eight taps 13 are operated by the control lever 12. In the position shown the taps are set for summer working in which condition heat is carried to the outside radiator 4 and cold is carried to the heat absorber 6, the heat radiator 5 being disconnected. For winter operation the lever 12 is pulled over to the other position, thus turning all the taps through 90 degrees, heat is then carried to the unit 5 in the building and cold is carried to the unit 4 outside the building, the unit 6 then being disconnected.

Turning now to Fig. 3 a form of heat absorber is shown in which the effective radiation area and effective radiation temperature can be independently varied and in which simultaneously the effective air contact area and the effective air contact temperature can be independently varied. A radiating panel 21 is supplied with cold liquid through a pipe 22 leading through a wall 23. After cooling the radiating surface of the panel 21 the liquid returns through the pipe 24 to be re-chilled. Gutter arrangements 25 and 26 are provided on both sides of the panel 21 and lead to drainage pipe 27.

In the form shown in Fig. 3 the heat absorber panel 21 is flush with the inside wall, portion of which, 32, is shown near the ceiling 33. A space 39 is provided in the wall 32 so that the air can flow from the room over the top of the panel 21 into the space behind the panel. At the bottom of the panel 21 a continuation 34 of the wall 32 is provided with louvre 35, controllable by a lever 36.

Apart from the louvre 35 and the abovementioned hole 39 above the panel 21 the wall 32 and 34 completely closes off the space behind the panel 21. In this space are non-radiating heat absorber pipes 28, supplied with cold liquid through a pipe 29, the liquid returning through pipe 30 to be re-chilled. Condensation upon the pipes 28 is collected by the troughs 31 and drained into pipe 27. Louvre 35 thus provides a means of adjusting the flow of air past the pipes 28. Furthermore, complete closure of the louvre 35 reduces the total effective air control area by the effective air contact area of the pipes 28 and the back of the panel 21. Thus, by closing the louvres associated with a number of the panels corresponding to 21 the effective air contact area may be reduced by any desired amount. It cannot, of course, be reduced to zero for the reason that the outside radiating surfaces of the panel 21 and the corresponding other panels provide a certain minimum air contact area even when the louvre 35 and those corresponding to its associated with the other panels are all closed. However, it is clear that the arrangement of louvre 35 and pipes 28 provides a wide adjustment of the effective air contact area.

In one form of the invention at least one panel of the heat absorber 6 is constructed in the manner shown in Fig. 3 that is to say with a radiating panel 21 and additional air contact surface 28, these latter being non-radiating so far as the interior of the room is concerned. Other panels of the heat absorber 6 may be simplified by the omission of the non-radiating surface provided by the pipes 28.

Returning to Fig. 3 the pipe 37 admits new air into the room and the pipe 38 provides an outflow for excess air. This arrangement has the advantage that the new air flows past the non-radiating surfaces 28 mixed with a smaller proportion of de-humidified air than would occur if the new air were fed into the room otherwise than from behind the panel 21. The dew point of the air passing over the surfaces 28 is consequently higher than it would be for air taken into the room otherwise, and consequently any excess of moisture in the outside air is more quickly removed than would be possible if outside air were mixed with the drier air inside the room before passing through the panel at 39 and thence on to the moisture extraction surface 28.

One method of controlling the effective radiation area of the heat absorber 6 or of the heat radiator 5 is shown in Fig. 4a and Fig. 4b. The heat absorber 6 as abovementioned consists of a plurality of independent panels. Each one of these panels is supplied with chilled liquid through a separate pipe. In Fig. 4a nine such pipes 41 to 49 are shown, the chilled liquid for which comes from the single supply pipe 40.

Fig. 4a represents diagrammatically a section through a control cock enabling chilled liquid to be supplied to any proportion of the heat absorber panels. The plug 50 is semi-circular in shape at the section plane, the metallic portion being shown by the shaded area 50.

Fig. 4b shows the pipes 41 to 46 closed and the pipes 47 to 49 being supplied with chilled liquid. As can be seen from Fig. 4a all the pipes between the supply pipe 40 and the extreme outgoing pipe 41 must lie within one semi-circle so that these pipes can be opened simultaneously. Similarly it will be clear that a semi-circular member 50 will be able to block all the pipes 41 to 49 simultaneously.

Fig. 2 shows one method of independently adjusting the effective area and effective temperature of the radiation units or air contact units of a heating and cooling system as previously described. Identical equipment may be used with both the above units to provide these adjustments. Equipment of the type shown in Fig. 2 when duplicated for both radiation and air contact units, will provide an independent control of effective radiation temperature, effective radiation area, effective air contact temperature and effective air contact cross section area. In Fig. 2, therefore, the heating and cooling unit 62 is representative of a radiation unit or an air contact unit.

Chilled liquid is supplied to the air contact or radiation unit 62 from the freezing unit 3, identical with 3 in Fig. 1, through a piston valve 52 of a well known type and a control cock 51 or any other like unit. The control cock 51 is provided with a single intake pipe 53 and a plurality of outlets. To these outlets are connected the supply pipes for the individual air contact or radiation units. The outlet 54 is shown connected to the supply pipe 63. The pipe 64 returns the liquid to the freezing unit 3.

To alter the effective air contact or radiation area of the heating and cooling apparatus the position of the plug 50 is altered in the control cock, thereby obstructing the flow of chilled liquid in one or more of the supply pipes. It is essential that the unit actuating the thermostat means be fed from the last outlet of cock 51 to be closed by plug 50, as shown in the drawing.

Any known thermostat means, providing a manual setting may be incorporated in the system, and the following description relates to one of such devices.

In close proximity to the surface of the unit 62 is placed a thermally sensitive resistance element 55, of any known type, such as iron wire, or, better still, silver sulphide. This resistance forms one arm of a bridge 56. A resistance 57 forming another arm of the bridge is made variable and serves as a control for the manual setting of the effective air contact or radiation temperature. One side of the detector diagonal of the bridge is connected through a relay 58 to earth and the other side directly to earth. The relay contact is normally closed thereby providing battery 59 to energize the solenoid 60 and attract the piston arm against the tension of the return spring 61. This operation effectively blocks the flow of chilled liquid to the unit 62.

When the temperature of the surface of the unit 62 corresponds with the setting of the control 57, the resistive value of the element 55 will equal the resistance of this control. In this condition the bridge will be balanced and relay 58 unoperated. Thus the relay contact and the piston valve will be closed. The temperature of the unit 62 will therefore rise, causing the resistance of the element 55 to change and thereby unbalance the bridge 56.

This unbalance leads to current flow through the relay and consequently it operates. The relay contact opens and the piston arm is released by the solenoid. This valve then opens through the action of the return spring 61 on the piston and permits the flow of chilled liquid to the unit 62. This unit then cools down and at the temperature determined by the control the cycle of events will be repeated. Thus an adjustment of either air contact or radiation temperature has been effected.

It will be clear that the arrangement of taps shown in Fig. 1 may be varied without departing from the spirit of the invention. For example, two-way taps may be used.

Again, the arrangements shown in Figs. 2, 4a and 4b may be varied, any other means of varying the temperature and area of the individual units coming within the spirit of the invention.

In a similar way the number of panels of the heat absorber 6 constructed according to the arrangement in Fig. 3 may be varied to suit the particular requirements of the room. A large hall for a public meeting might be provided with a large number of panels constructed according to Fig. 3 and comparatively few according to the simplified method of omitting the pipes 28 and the louvre 35. In a private dwelling, on the other hand, the number of radiating panels will require to be larger in proportion to the number of moisture extraction panels so that the arrangement of Fig. 3 may be used for only one of the panels.

It will be likewise clear that refrigerant can be supplied directly to the heat absorber, for example, from a refrigeration distribution system.

When the heating and cooling system consists of a number of panels constructed in accordance with Fig. 3 it will be apparent that the conditioned air circulated by the system is divided between a number of parallel paths. The volume of conditioned air supplied by the system during any period of time would be the sum of the volumes of air circulated by each of these paths, and for all practical purposes, can be considered as being that volume of air which would pass through a pipe of a certain cross section area during the given period of time. The exact cross section area of the pipe will be determined by the number of paths and their respective cross section areas. The control cock 51 in obstructing or permitting the flow of refrigerant to an air contact unit, stops or starts the circulation of conditioned air in the path provided by this unit and in this manner an adjustment of the number of paths is provided. The vents 35 in closing restrict the flow of air through their respective paths and hence provide an adjustment of the cross section areas of these paths. It will be clear therefore from the above that two controls are available, one giving course adjustment, the other fine adjustment, for varying the effective cross section area of the air contact units.

It will be seen that by means of the invention in summer many of the advantages of air conditioning, namely reduction in the temperature and humidity content of the air are obtained, also two new advantages are secured, by the invention. In the first place all the cold produced by the refrigerating unit is made available inside the room. In the second place, a new effect is introduced by the direct radiation of cold in opposition to the radiation of heat in the outside walls. In order to obtain comfortable living conditions by air cooling alone, it is necessary to cool the air so much to neutralize the heat radiated from the walls, that frequently a chilly feeling is experienced in an air-conditioned room. The present invention by catering for wall radiation, reduces very considerably this chilly feeling and permits the feeling of coolness to be obtained without such drastic lowering in air temperature. In winter, the invention has the advantage that the heat efficiency obtained is greater than 100%. That is to say, more heat is provided in the room than is taken from the electricity mains operating the unit.

I claim:

1. Apparatus for air-conditioning rooms and the like, comprising: radiation means having an effective area for absorbing heat radiation; air contact means having an effective cross section area for air passing over heat absorbing surfaces; means for adjusting the effective temperature of said radiation means, and means for adjusting the effective area thereof for absorbing heat radiation; means for adjusting the effective temperature of said air contact means, and means for adjusting said effective cross section area, each of said four adjusting means being adjustable independently of the others, said air contact area adjusting means comprising a valve chamber having an inlet and a plurality of outlets, opened in sequence by a rotatable valve element, within said chamber, and means connecting said outlets respectively to independent sections of said air contact means.

2. Apparatus for air-conditioning rooms and the like, comprising: radiation means having an effective area for absorbing heat radiation; air contact means having an effective cross section area for air passing over heat absorbing surfaces; means for adjusting the effective temperature of said radiation means, and means for adjusting the effective area thereof for absorbing heat radiation; means for adjusting the effective temperature of said air contact means, and means for adjusting said effective cross section area, each of said four adjusting means being adjustable independently of the others, said radiation area adjusting means comprising a valve chamber having an inlet and a plurality of outlets, opened in sequence by a rotatable valve element, within said chamber, and means connecting said outlets respectively to independent sections of said radiation means.

THOMAS SAMUEL SKILLMAN.

REFERENCES CITED

The following references are of record in the file of this patent:

UNITED STATES PATENTS

| Number | Name | Date |
|---|---|---|
| 899,078 | Salmon | Sept. 22, 1908 |
| 1,928,737 | Otto | Oct. 3, 1933 |
| 1,937,774 | Naylor | Dec. 5, 1933 |
| 2,110,693 | Bailey | Mar. 8, 1938 |
| 2,240,951 | Hamjy | May 6, 1941 |
| 2,255,292 | Lincoln | Sept. 9, 1941 |
| 2,260,887 | Dasher | Oct. 28, 1941 |
| 2,303,094 | Sharpe | Nov. 24, 1942 |
| 2,392,553 | Rollins | Jan. 8, 1946 |
| 2,442,201 | Elberty | May 25, 1948 |